United States Patent
Hullender et al.

(10) Patent No.: US 7,412,095 B2
(45) Date of Patent: *Aug. 12, 2008

(54) PREPROCESSING OF MULTI-LINE ROTATED ELECTRONIC INK

(75) Inventors: Gregory N. Hullender, Bellevue, WA (US); Ahmad Abdulkader, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/257,332

(22) Filed: Oct. 24, 2005

(65) Prior Publication Data

US 2006/0034516 A1 Feb. 16, 2006

Related U.S. Application Data

(63) Continuation of application No. 10/144,233, filed on May 10, 2002, now Pat. No. 7,010,165.

(51) Int. Cl.
*G06K 9/18* (2006.01)

(52) U.S. Cl. .................... 382/186; 382/177; 382/187; 382/189; 382/294; 382/295; 382/296

(58) Field of Classification Search ................. 382/177, 382/186–189, 294–296
See application file for complete search history.

(56) References Cited

U.S. PATENT DOCUMENTS

| | | | | |
|---|---|---|---|---|
| 5,321,770 A | * | 6/1994 | Huttenlocher et al. | 382/174 |
| 5,325,447 A | * | 6/1994 | Vogt, III | 382/102 |
| 5,428,805 A | | 6/1995 | Morgan | |
| 5,517,578 A | * | 5/1996 | Altman et al. | 382/181 |
| 5,537,489 A | * | 7/1996 | Sinden et al. | 382/187 |
| 5,617,019 A | | 4/1997 | Etter | |
| 5,655,136 A | * | 8/1997 | Morgan | 382/187 |
| 5,680,470 A | * | 10/1997 | Moussa et al. | 382/119 |
| 5,812,698 A | * | 9/1998 | Platt et al. | 382/186 |
| 6,111,985 A | * | 8/2000 | Hullender et al. | 382/229 |
| 6,137,905 A | * | 10/2000 | Takaoka | 382/173 |
| 6,148,104 A | * | 11/2000 | Wang et al. | 382/185 |
| 6,226,404 B1 | * | 5/2001 | Ikebata | 382/187 |
| 6,535,897 B1 | | 3/2003 | Altman | |
| 6,587,587 B2 | * | 7/2003 | Altman et al. | 382/181 |
| 6,757,424 B2 | * | 6/2004 | Love | 382/154 |
| 7,010,165 B2 | * | 3/2006 | Hullender et al. | 382/186 |
| 2002/0150295 A1 | * | 10/2002 | Kwok et al. | 382/186 |

OTHER PUBLICATIONS

Milligan, T., "More Applications of Euler Rotation Angles," Antennas and Propagation Magazine, IEEE, pp. 78-83, vol. 41, Issue: 4, Aug. 1999.*

(Continued)

*Primary Examiner*—Bhavesh Mehta
*Assistant Examiner*—John B Strege
(74) *Attorney, Agent, or Firm*—Birch, Stewart, Kolasch & Birch, LLP

(57) ABSTRACT

An electronic ink object is preprocessed for improving handwriting recognition results. An electronic ink object, possibly having multiple lines of non-horizontal ink, is preprocessed by segmenting or separating the electronic ink object into one or more lines, computing a writing angle of each line, and rotating each line so that it is horizontal.

24 Claims, 9 Drawing Sheets

OTHER PUBLICATIONS

The Discriminatory Power of Handwriting, Sugar N. Srihari[A], Sung-Hyuk Cha[B], And Sangjik Lee[A], [A]Cedar, University at Buffalo, State University of New York, Buffalo, NY 14228, [b]Pace University, Pleasantville, NY 10570, Paul B. Kantor, Tapas Kanunugo, Jiangying Zhou, Editors, Proceedings of SPIE vol. 4670 (2002).

Overlapped-Character Separation and Reconstruction for Table-Form Documents, Jain-Shiue Chen and Din-Chang Tseng, Institute of Computer Science and Information Engineering, National Central University, Chung-Li, Taiwan 32054, © 1996 IEEE.

Milligan, T., "More Applications of Euler Rotation Angles," Antennas and Propagation Magazine, IEEE, pp. 78-83, vol. 41, Issue 4, Aug. 1999.

\* cited by examiner

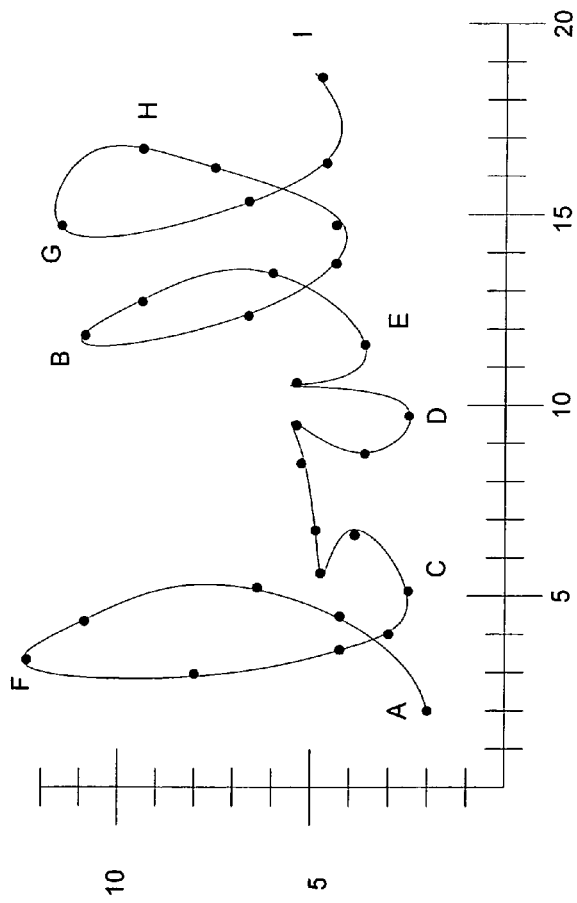
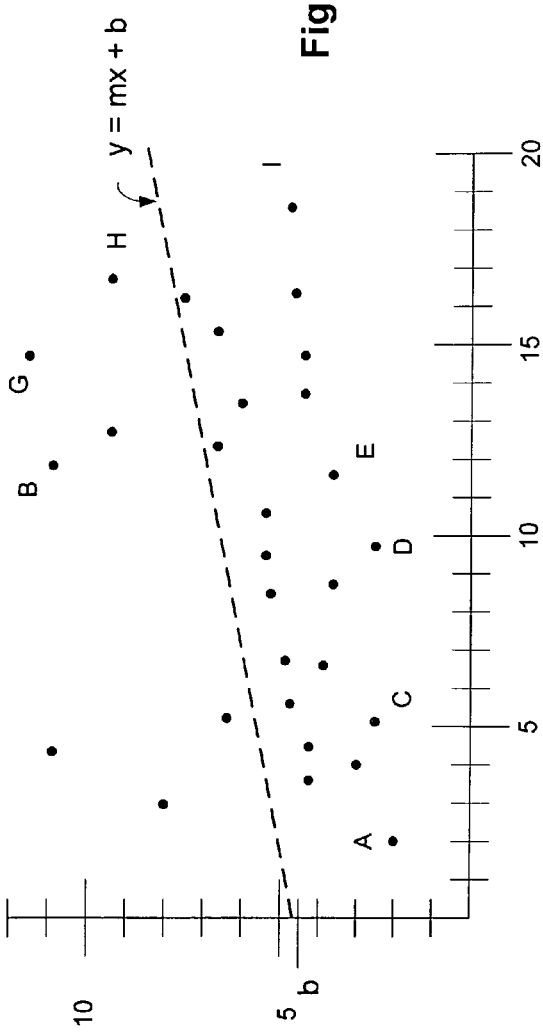

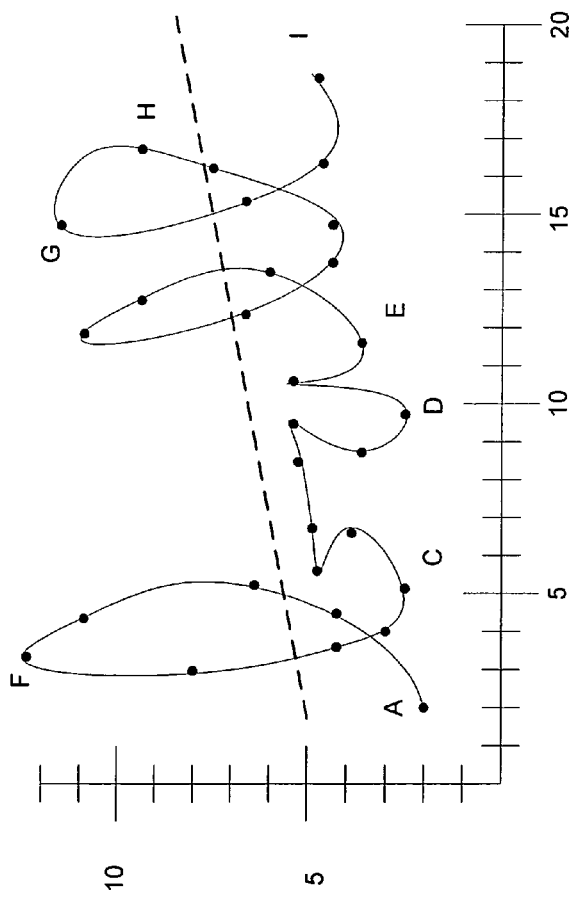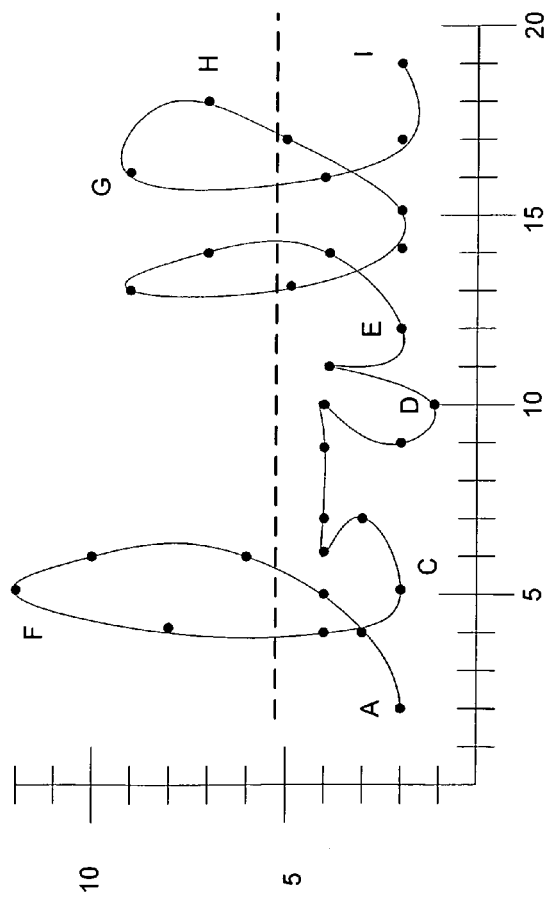

PREPROCESSING OF MULTI-LINE ROTATED ELECTRONIC INK

This application is a continuation of and claims priority from U.S. patent application Ser. No. 10/144,233, filed May 10, 2002, now U.S. Pat. No. 7,010,165 which is herein incorporated by reference.

FIELD OF THE INVENTION

Aspects of the invention are directed generally to apparatus and methods for character recognition. More particularly, aspects of the invention relate to preprocessing techniques for multi-line rotated electronic ink.

BACKGROUND OF THE INVENTION

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface. The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document on-screen because of the ability to freely make notes outside of the confines of the keyboard and mouse interface.

Some computer systems permit a user to write on a screen using, for example, a stylus. For example, the Microsoft READER application permits one to add electronic ink (also referred to herein as "ink") to a document much the same way that a user would write with a standard pen and paper. Most hand-held computing devices, commonly known as Personal Digital Assistants (PDAs), also permit the user to write on the screen.

A handwriting recognition system may then be used to analyze the electronic ink to recognize characters, for example, Unicode characters. As the user moves the stylus across the screen, the computing device senses the position of the stylus as the user writes and stores the position data. The computing device analyzes the position data and converts it to recognized characters, such as letters or numbers, in a convenient format, such as Unicode format.

In particular, the handwriting recognition system uses algorithms to map handwritten data to characters. For example, the system may store training data for each character that can be recognized. The training data allows the system to map the user's input to characters. As long as the user writes like the training data, the handwritten data is successfully recognized. Conversely, the more dissimilar the user's input and the training data are, the more likely it is that the handwritten data will be misrecognized.

Over the years, handwriting recognizing systems have evolved to more closely simulate the user's normal writing experience with a pen and paper. For example, early handwriting recognizing systems required the user to write each letter in a separate box. Subsequent handwriting recognizing systems moved away from the box and even allowed the user to write in cursive, however, required the user to write on a horizontal line. Even subsequent evolutions allowed the user to write anywhere on the user interface screen but still required the handwriting to be horizontal.

Although handwriting recognition systems have grown in popularity and flexibility for computing devices, they do not accommodate certain common writing habits of the user. For example, existing handwriting recognizing systems require the user to write horizontally. As the user deviates further from writing horizontally, the handwriting recognition system quickly starts mis-recognizing characters. In fact, a slight deviation from the horizontal writing axis may quickly result in a 100% error rate in handwriting recognition. This limits the user's interaction with, for example, a tablet PC where the user may naturally deviate from a horizontal writing path. Also, user interaction is limited where the user seeks to annotate a document on the margins with comments that may be written at an angle.

Another limitation is that existing handwriting recognizing systems cannot recognize whether the user has handwritten multiple angled lines of information. For example, the user when annotating a document may write in multiple angled lines. Existing handwriting recognition systems, however, are not capable of recognizing whether the user is writing on multiple lines where the user is not writing on a horizontal line.

Accordingly, to better mirror the user's experience with writing on a traditional pad of paper, it is therefore desirable to process electronic ink for handwriting recognition in a manner that overcomes one or more of the above problems.

BRIEF SUMMARY OF THE INVENTION

The invention provides a preprocessing technique of an electronic ink object for more accurate character recognition. In accordance with one embodiment of the invention, a preprocessor receives an electronic ink object, possibly having multiple lines of non-horizontal ink, and generates a line-separated and rotated electronic ink object. The preprocessor generally comprises an electronic ink feature generator, a classifier, a centerline generator, and an ink transformer. The electronic ink feature generator analyzes each incoming stroke of the ink object and generates a plurality of features for each ink stroke. The classifier determines based on the features of the ink stroke whether the ink stroke is part of a new line, a current line, or a previous line. The centerline generator computes a centerline of each line of the electronic ink object and the ink transformer rotates each line of the electronic ink object so that each line is horizontal. The resulting line-separated and rotated electronic ink object can now be more accurately analyzed for character recognition.

In another aspect of the invention, an electronic ink object, possibly having multiple lines of non-horizontal ink, can be preprocessed for more accurate character recognition by segmenting or separating the electronic ink object into one or more lines. Once the electronic ink object has been separated according to lines, each line can be further preprocessed. The writing angle of each line is computed and, based on the computed writing angle of the line, the line can then be rotated so that it is horizontal.

Depending on the application, preprocessing the electronic ink object for only line separation or ink rotation may be desirable. These and other features and aspects of the invention will be apparent upon consideration of the following detailed description of various embodiments of the invention.

BRIEF DESCRIPTION OF THE DRAWINGS

The foregoing summary of the invention, as well as the following detailed description of embodiments, is better understood when read in conjunction with the accompanying drawings, which are included by way of example, and not by way of limitation with regard to the claimed invention.

FIG. 8A depicts a line of electronic ink.

FIG. 8B depicts a set of data points and a centerline for the line of electronic ink of FIG. 8A.

FIG. 9A is another depiction of the set of data points and the centerline for the line of electronic ink of FIG. 8A.

FIG. 9B depicts the line of electronic ink of FIG. 8A that is rotated to be horizontal in accordance with an embodiment of the invention.

DETAILED DESCRIPTION OF THE INVENTION

Figure 1:
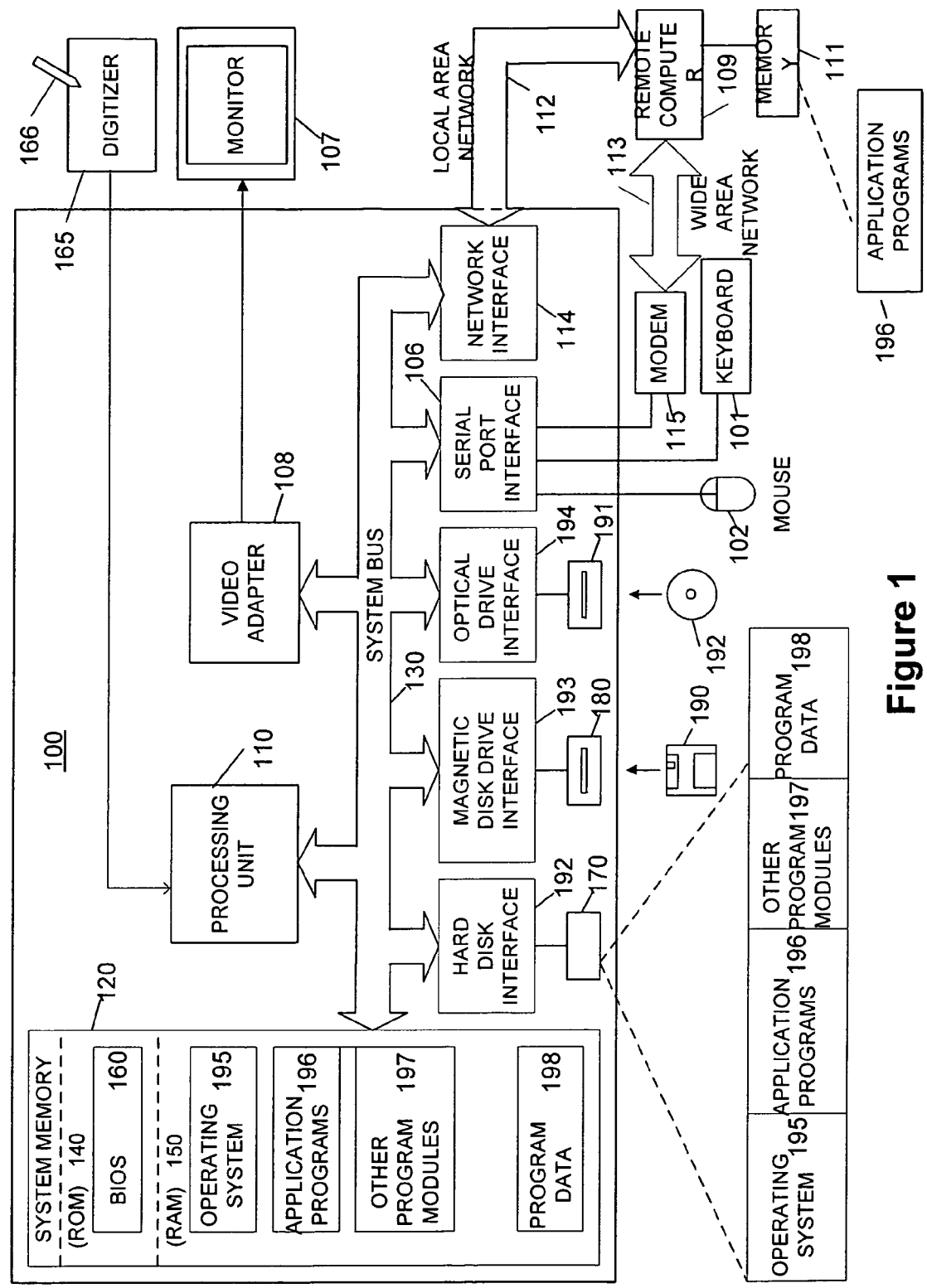
FIG. 1 shows a schematic diagram of a general-purpose digital computing environment that can be used to implement various aspects of the invention.

The exemplary disclosed system and method provide for more accurate recognition of electronic ink that entails multiple lines and/or is not horizontal. In particular, a preprocessor receives an electronic ink object and segments or separates the electronic ink object into one or more lines. For each line, the preprocessor calculates a writing angle of the line and rotates the line to cause the lines of electronic ink to be horizontal. The resulting line-separated and rotated electronic ink object can then be more accurately analyzed for character recognition. Moreover, the preprocessor is trainable to accommodate various users, for example, by the specific user's habits as well as based on language.

Although not required, the invention will be described in the general context of computer-executable instructions, such as program modules. Generally, program modules include routines, programs, objects, scripts, components, data structures, and the like that perform particular tasks or implement particular abstract data types. The invention provides for a software system that may be implemented on any network infrastructure such that networked devices may be remotely controlled by, for example, a general-purpose computer, or a system whereby the networked devices may share information with and about each other. The invention provides and accepts common command, control, and communication through the network while retaining the ability of each device to operate autonomously. In a distributed computing environment, program modules may be located in both local and remote memory storage devices.

Terms

Ink or electronic ink as used herein refers to a sequence or a set of strokes with properties. The sequence of strokes may include strokes ordered, for example, by the time captured. Each stroke is comprised of a sequence of points, which may be represented using a variety of known techniques including Cartesian coordinates (X, Y), polar coordinates (r, $\Theta$), and other techniques as known in the art.

A stroke as used herein refers to a sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. In one example, as illustrated herein, a stroke may consist of the sequence or set of points captured from when a user makes a pen down action to when the user makes a pen up action.

A point as used herein refers to information defining a location in space. For example, the points may be defined relative to a capturing space (for example, points on a digitizer), a virtual ink space (the coordinates in a space into which captured ink is placed), and/or display space (the points or pixels of a display device).

A line of electronic ink as used herein refers to those strokes that form a line of written material. For example, window 203a of FIG. 2 consists of five lines of electronic ink.

General Purpose Computing Environments

FIG. 1 illustrates a schematic diagram of an exemplary conventional general-purpose digital computing environment that can be used to implement various aspects of the invention. The invention may also be implemented in a simplified version of computer 100, for example without limitation, a hand-held computing device, a tablet PC, or may be an application for use with a more general computing device such as a personal computer. The invention may also be implemented in part of a multiprocessor system, a microprocessor-based or programmable consumer electronic device, a network PC, a minicomputer, a mainframe computer, and the like. Hand-held devices available today include Pocket-PC devices manufactured by Compaq, Hewlett-Packard, Casio, and others.

Referring still to FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In one embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for communicating over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
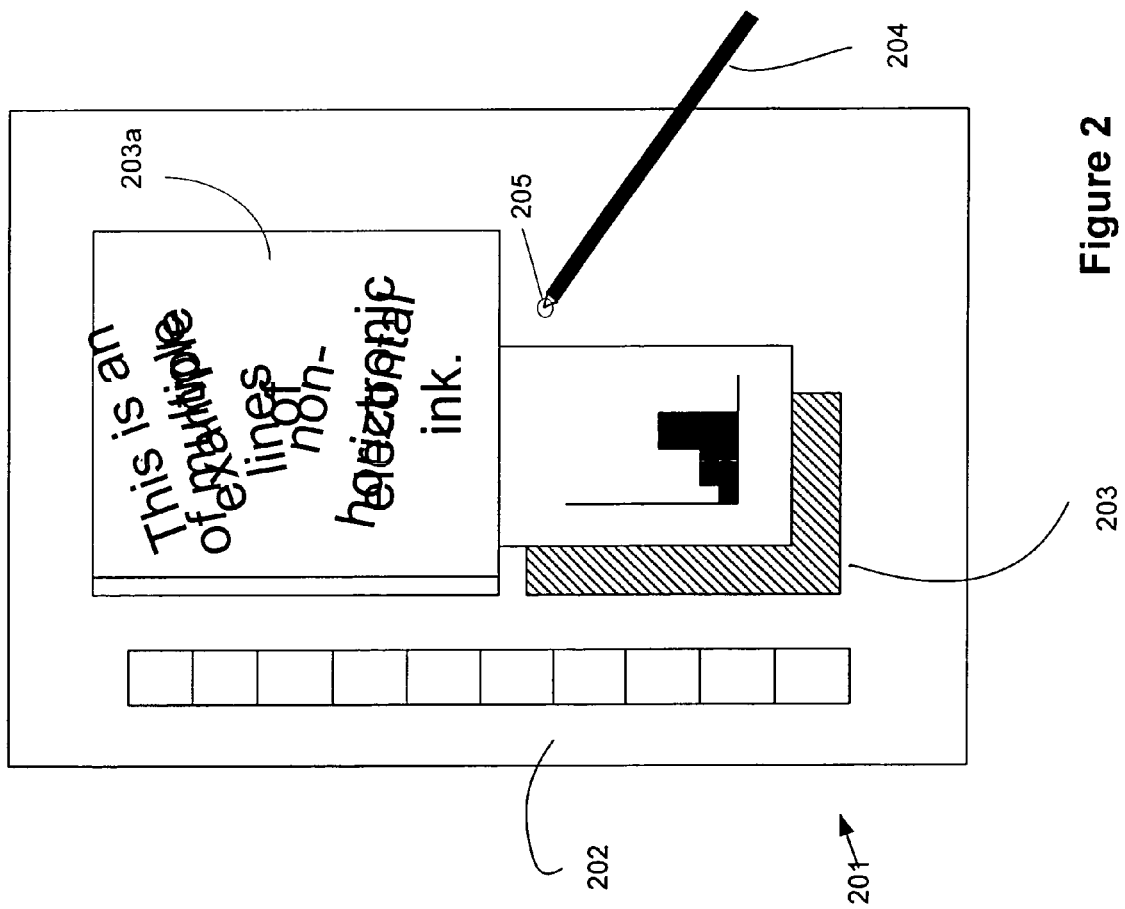
FIG. 2 is a schematic block diagram of an exemplary hand-held device or tablet PC that can be used in accordance with various aspects of the invention.

FIG. 2 illustrates an exemplary hand-held device or tablet PC 201 that can be used in accordance with various aspects of the invention. Any or all of the features, subsystems, and functions in the system of FIG. 1 can be included in the computer of FIG. 2. Hand-held device or tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Hand-held device or tablet PC 201 interprets gestures made using stylus 204 in order to manipulate data, enter text, create drawings, and/or execute conventional computer application tasks such as spreadsheets, word processing programs, and the like. For example, a window 203a allows a user to create electronic ink using stylus 204. The electronic ink in window 203a illustrates an example of multiples lines of electronic ink wherein the lines of ink are not horizontal.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

In various embodiments, the system provides an ink platform as a set of COM (component object model) services that an application can use to capture, manipulate, and store ink. One such service enables an application to read and write ink using the disclosed representations of ink. The ink platform may also include a mark-up language including a language like the extensible markup language (XML). Further, the system may use DCOM as another implementation.

An Example of Strokes of Ink

Figure 3:
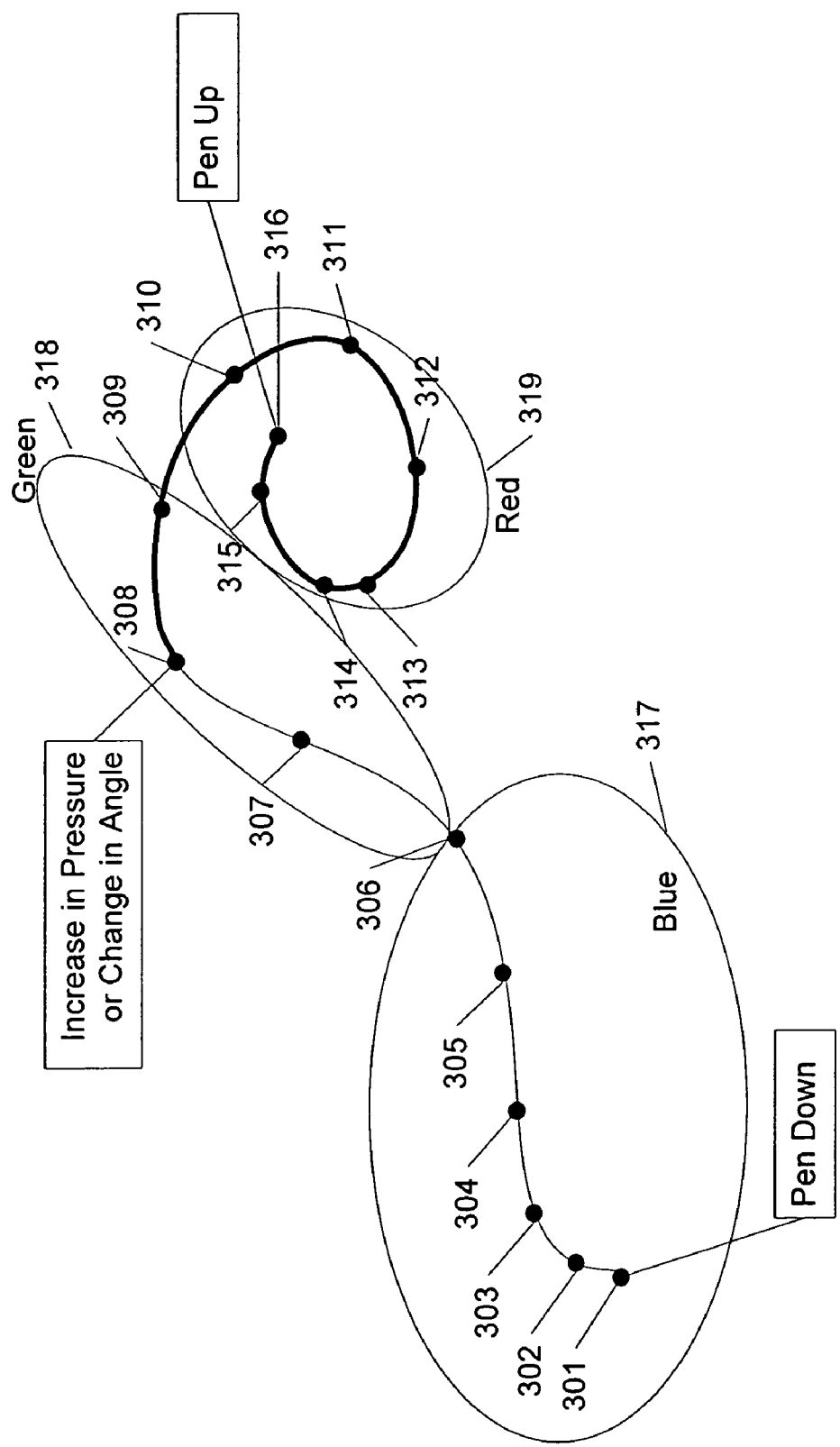
FIG. 3 shows an example of a stroke or strokes of ink having points and properties.

An exemplary ink object is shown in FIG. 3. The ink object starts at point 301 where a pen down action occurred. The pen down action may be stylus 204 contacting the display surface 202, the click of a mouse button, the operation of a button on a trackball or joystick, or the like. The user controls an input (such as stylus 204) device and the resulting ink continues through points 302-316. At point 316, a pen up action occurred. The pen up action may be the lifting of the stylus 204 off the display surface 204, releasing or another operation of a mouse button, or the operation of the button (or other buttons) on the trackball or joystick or the like. Here, a pen up action and a pen down action are known in the pen digitizing art.

From points 301 through 308, the width of the stroke has a first value. At point 308, the width of the stroke changes to a second value. This may have been because the user increased the pressure between the stylus 204 tip and the display surface 202, because the angle between the stylus 204 and the tablet changed, because the stylus 204 was rotated and projected a different cross section of the stylus 204's nib, or the like. The stroke then continues through point 316 with the second stroke width. In an alternate embodiment, a user started the stroke with a first line width and selected a different line width at point 308 to complete the stroke. In this example, the ink having points 301-316 may be defined as a single stroke. In a further embodiment, two strokes may form the ink object as shown in FIG. 3. For example, a first stroke may include points 301-308 and a second stroke may include points 308-316.

In a further embodiment, the ink of FIG. 3 may be represented as four or more strokes. Here, the stroke or strokes from points 301 to 306 may be blue (represented by group 317) with the first stroke width, the stroke or strokes from points 306 to 308 may be green (group 318) with the first stroke width, the stroke or strokes from points 308 to 309 may be green (also as part of group 318) with the second stroke width, and strokes or strokes from points 310 to 316 may be red (group 319) with the second stroke width.

Next, the ink object may be stored (or transmitted or displayed or the like). The ink object stroke may be represented as a single stroke with varying line widths and colors. Alternatively, the ink object may be stored as a variety of strokes having a few data points in which each stroke has its own set of properties. Third, the ink object may be stored as short strokes between points. In short, the ink object may represent a stroke in a variety of forms.

Creating and Rendering Ink

Figure 4:
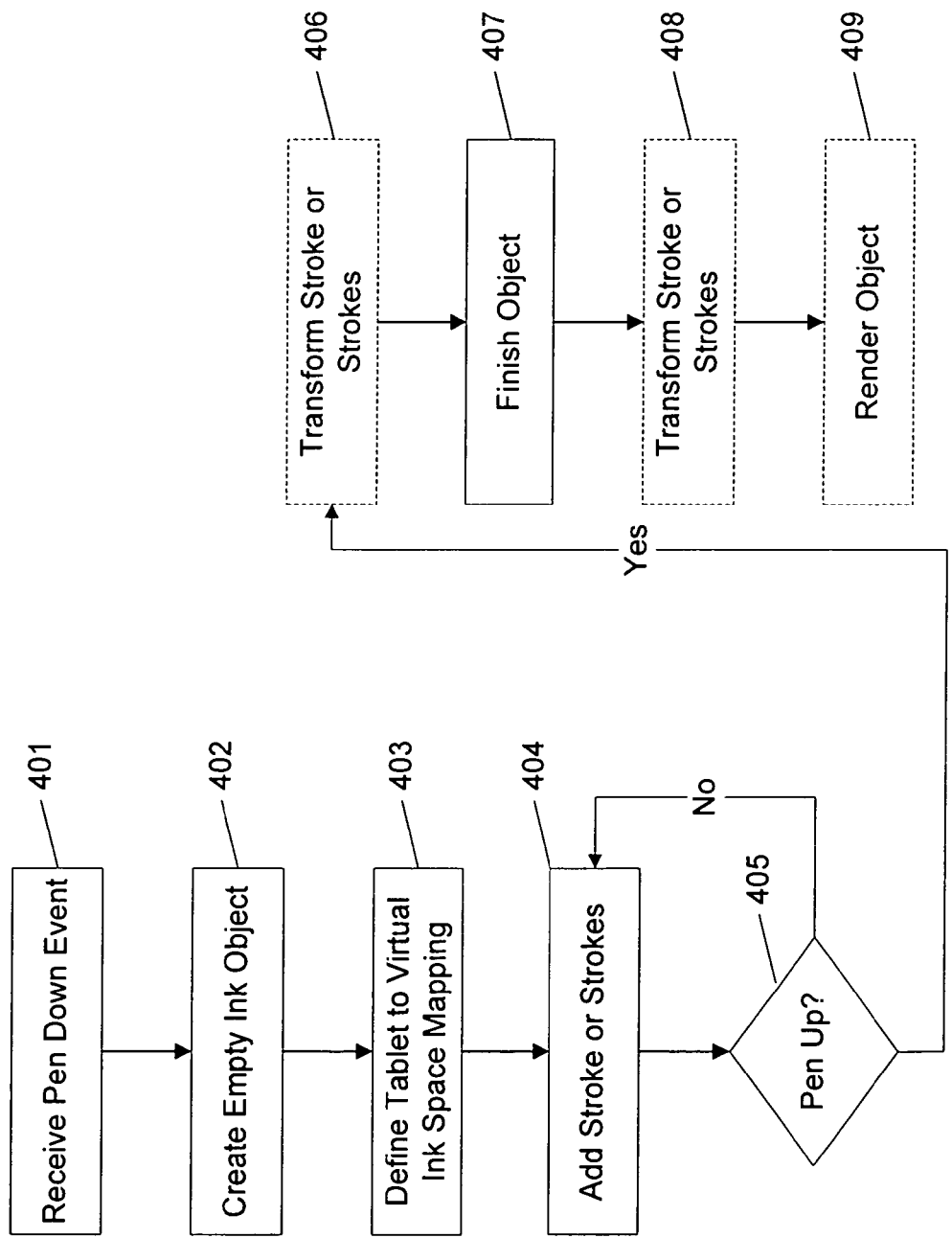
FIG. 4 is a flow chart illustrating an exemplary process for creating and rendering ink.

FIG. 4 illustrates an exemplary process for creating and rendering ink. In step 401, the system receives an event indicating that the ink is about to be created. Here, this event is referred to as a "pen down" event. In step 402, the system creates an empty ink object for storing the created ink. In step 403, the system defines a mapping from the capturing device to a virtual ink space. Here, the mapping may include a set of equations, a listing of coordinates, and the like. Further, the definition of the tablet space to the virtual ink space may be the specification of the tablet and the specification of the virtual ink space.

Next, in step 404, a stroke is added to the ink object. In an alternative embodiment, strokes may be added as a group to the ink object. In step 405, the system determines whether an event has occurred that signals the end of the ink stroke. This event may be a "pen up" event or any other event that may indicate that no more strokes are to be added to the ink object. In an alternative embodiment, the ink object may have strokes added even after the pen up event or alternative event.

In step 406, a transform mapping may be applied to the strokes. For example, if a tablet has a high resolution and the ink object is not storing coordinates in such a high resolution, an initial transform may be applied to the stroke or strokes in the ink object in step 406.

In step 407, the ink object is finished. The finished ink object may be stored or otherwise handled. For example, the stroke or strokes may be transformed in step 408. Also, the ink object may be rendered in step 409. The steps 406, 408, and 409 are optional in this process as shown by their dotted boxes. Further, the definition 403 of the transform or transforms to be applied to ink strokes may be determined after the ink strokes have been added to the ink object.

Preprocessing of an Ink Object

Figure 5:
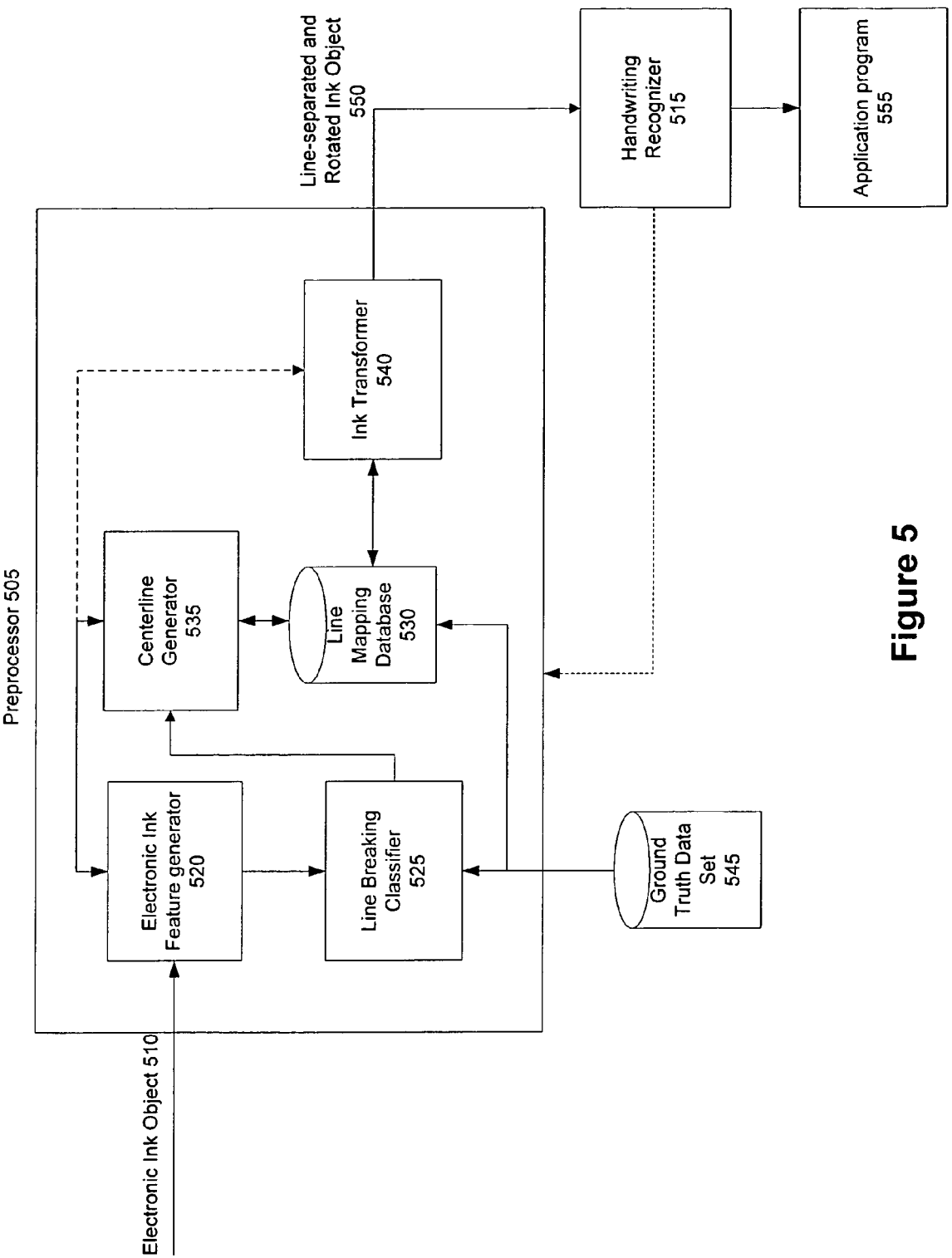
FIG. 5 is a schematic block diagram of a preprocessing system for line separating and rotating an electronic ink object in accordance with an embodiment of the invention.

FIG. 5 is a schematic block diagram of a preprocessing system for electronic ink in accordance with one embodiment of the invention. The preprocessing system generally includes a preprocessor 505 that receives an electronic ink object 510 as an input and outputs a line-separated and rotated electronic ink object 550. The output may be provided, for example, to a handwriting recognizer 515 for character recognition. The handwriting recognizer 515 may then more accurately generate information regarding the electronic ink object 510 for use by one or more application programs 555. Those skilled in the art will appreciate that the handwriting recognizer 515 may output information regarding the electronic ink object 510 in any number of formats and in any order to suit the needs of the application program 555. For example, the handwriting recognizer 515 may provide spaces between words and carriage returns between lines for the application program 555. As another example, the handwriting recognizer 515 may provide information regarding the number of lines in the electronic ink object 510 and wait for cues from the application program 555 to provide information regarding the electronic ink in each line.

The preprocessor 505 generally includes an electronic ink feature generator 520, a line breaking classifier 525, a centerline generator 535, a line mapping database 530, and an ink transformer 540. Each of these elements is discussed in greater detail herein.

The electronic ink feature generator 520 receives the electronic ink object 510 from a user interface of the computing device and generates for each stroke within the electronic ink object 510 a set of features that quantifies various features of the electronic ink object 510. The features may be used for any number of reasons including, for example, to make line segmentation determinations, to identify a centerline of a line (discussed herein), and to rotate the electronic ink object 510 (discussed herein). Features that may be used to make line segmentation determinations may include, without limitation, the following:

a. The complexity of the stroke (whether the stroke is relatively straight or curvy), which may be quantified, for example, using the following formula (where max $(\Delta x, \Delta y)$ is the largest vertical or horizontal change from endpoint to endpoint, and $$\sum_N \max(\Delta x, \Delta y)$$

is the sum of the largest vertical or horizontal changes for each of the N data points in the stroke; a value approaching 1 reflecting a relatively simple stroke and a value approaching 0 reflecting a relatively complex stroke):

$$\frac{\max(\Delta x, \Delta y)}{\sum_N \max(\Delta x, \Delta y)}$$

b. A measure of how far the user went back horizontally relative to the current line before writing the new stroke.

c. The average probability that each of the points of local extrema of the input stroke fits within the line model. A Gaussian model is presumed for each line. The mean and standard deviation of the model are computed using the vertical distance between local extrema of the points on the strokes added to the line so far and the estimated centerline. This probability is computed for each of the lines to which the new stroke might belong.

d. The vertical overlap between the new strokes and each of the lines to which the new stroke might belong.

Other examples of features include, again without limitation, the number of cusps in the stroke, the distance along in the stroke where each cusp occurs, the horizontal distance between the midpoint of the new stroke and the average midpoint of all the strokes in each of the lines to which the new stroke might belong, etc. In one embodiment of the invention, the electronic ink feature generator 520 may generate anywhere between 10-20 features for a given stroke for purposes of making line segmentation determinations. Those skilled in the art, however, will appreciate that any number of features may be generated depending upon the complexity and design of the line breaking classifier 525.

For each ink stroke in the electronic ink object 510, the electronic ink feature generator 520 provides to the line breaking classifier 525 those features that are to be used for making line segmentation determinations. In accordance with one embodiment of the invention, the line breaking classifier 525 is a neural network that has been trained to classify each new stroke. Known to those skilled in the art, a neural network is generally a type of artificial intelligence that attempts to imitate a human brain. See Rumehhart "Parallel Distributed Processing" (MIT Press, 1986). Rather than using a digital model, in which all computations manipulate zeros and ones, a neural network creates connections between processing elements, the computer equivalent of neurons. The organization and weights of these connections determine the output.

Those skilled in the art will appreciate, however, that a neural network is just one preferred embodiment of the line breaking classifier 525 and that any number of techniques may be implemented to classify a stroke relative to a line. Such alternative preferred embodiments of the line breaking classifier 525 include, but are not limited to, hidden Markov models, decision trees, Bayesian nets, K Nearest Neighbor (KNN), Expert Systems which are generally known to those skilled in the art.

In the embodiment where the line breaking classifier 525 is a neural network, the neural network receives as inputs various features of the stroke calculated by the electronic ink feature generator 520. Each feature of the stroke is a quantified value that can be understood by the neural network. The neural network thereby processes the inputted features and generates as outputs information regarding whether the stroke is a continuation of the current line, part of the previous line, or a start of a new line. Initially, the neural network will be trained or "truthed" using a ground truth data set 545, using known techniques, to correlate electronic ink features with correct results. The ground truth data set 545 may train the neural network to accommodate varying writing styles and can be as specific as the individual user to general based on a language.

The neural network may have, for example, N outputs, one for designating a new line, another for designating the current line, and N-2 outputs each for designating a corresponding previous line. In this example, for any input of features for a give stroke, the neural network is expected to generate one high (or 1) output and N-1 low (or 0) outputs. The high (or 1) output will identify the line to which the neural network determined the new stroke belongs (a new line, the current line, or a specific previous line). The number of outputs may be configured according to various design principles. Again, the neural network may be configured to have other outputs to identify the line to which the new stroke belongs. Similarly, the neural network can have one or more layers. Generally, the neural network may have an input layer, one or more hidden layers depending upon the number of nodes, and an output layer. Moreover, the neural network can be configured as a fully connected or a locally connected network.

For each ink stroke, the centerline generator 535 receives as inputs information from (a) the line breaking classifier 525 regarding which line the ink stroke belongs to and (b) the electronic ink feature generator 520 regarding the data points that comprise the ink stroke. In the event that the ink stroke is part of a current or previous line, the centerline generator 535 may also receive information from the line mapping database 530 regarding the line to which the ink stroke belongs. As soon as the first line is identified starting with the first stroke, the centerline generator 535 builds a model of a line that is the centerline of the identified line. In particular, the centerline generator 535 determines a writing angle of each line of electronic ink. For example, in the electronic ink object illustrated in window 203a of FIG. 2, the line breaking classifier 525 determines a centerline, and thereby the writing angle, for each of the five lines of ink strokes. Any number of techniques may be implemented to calculate the writing angle. In one embodiment, the method of Least Mean Squares (LMS), which is known to those skilled in the art, is used to identify a line that represents the centerline of the written line.

Referring to the example of a line in FIG. 8A, the electronic ink feature generator 520 may characterize the ink stroke as a set of data points (A-I). Given a family of data points on a graph designating an ink stroke, the method of the Least Mean Squares can calculate the formula of a line that "best fits" the data points (i.e., minimizes the distance between the data points and the line). Mathematically, this centerline may be represented by the formula, $y=mx+b$, where m is the slope of the line and b is the y-axis intersection of the line (see FIG. 8B). By using the method of the Least Mean Squares, the m and b constants of the centerline may be computed. The writing angle of the line may thereby be determined once the slope (m) of the centerline is computed. Of course, the number of possible data points gathered by the electronic ink feature generator 520 for the stroke may vary. For example, only the local maxima or extrema of the stroke may be used. As yet another alternative, if the local extrema data points are too few, additional data points may be collected.

Moreover, those skilled in the art will appreciate that any number of techniques may be utilized to estimate the writing angle of the line. The model for estimating the line may vary in complexity. For example, the writing angle of the line may be modeled by a parabolic curve. Mathematically, under this embodiment, the line may be represented by the formula, $y=ax^2+bx+c$, where a, b, and c are constants (a higher order model may also be used). The writing angle of ink at any specific point may then determined by the slope of the curve at that point. As the above example illustrates, other formulas and certainly other techniques may be used to estimate the writing angle of each line.

Once the centerline generator 535 determines the centerline, and particularly the writing angle, for each ink stroke this information is output to a line mapping database 530 for storage and subsequent use by the ink transformer 540.

The centerline generator 535 may also perform feature computations that may be provided back to the electronic ink feature generator 520. For example, the centerline generator 535 may determine, for a given line or a given stroke, a Gaussian model of the data points and the standard deviation of the data points. This feature computation may then be provided back to the electronic ink feature generator 520 for use by the line breaking classifier 525. Thus, when future strokes are received, this feature computation of the previously received lines or strokes may help provide a probabilistic estimate of whether the new stroke is part of the current, a previous, or a new line.

Once strokes of a given sequence of electronic ink have been received, featurized, and line-separated, the preprocessor 505 may then rotate one or more lines from non-horizontal to horizontal. In particular, for a particular line, the ink transformer 540 receives the writing angle information as well as the ink object from the line mapping database 530 (the ink object may optionally be provided by the electronic ink feature generator 520) and rotates the electronic ink for the line according to the line's writing angle. Known graphics techniques (e.g., a rotation matrix) may be used to rotate the line of electronic ink so that it is horizontal. FIG. 8A depicts an example of a line written at an angle. In this example, the line contains a single stroke representing the word "Ball" written in cursive. The line contains data points A-I. FIG. 8B depicts data points A-I with the ink stroke removed. A line having equation y=mx+b is also shown which represents the Least Mean Squares line computed using the data points A-I. FIG. 9A is another depiction of data points A-I with the ink stroke and the computed centerline. FIG. 9B depicts the ink stroke rotated so that the centerline is now horizontal. As the centerline is rotated, corresponding rotations are also made to data points A-I and the ink stroke.

Once the electronic ink is line-separated and rotated, the preprocessor 505 is ready to provide the preprocessed electronic ink object 550 to, for example, the handwriting recognizer 515 to identify the characters that were written by the user.

Figure 6:
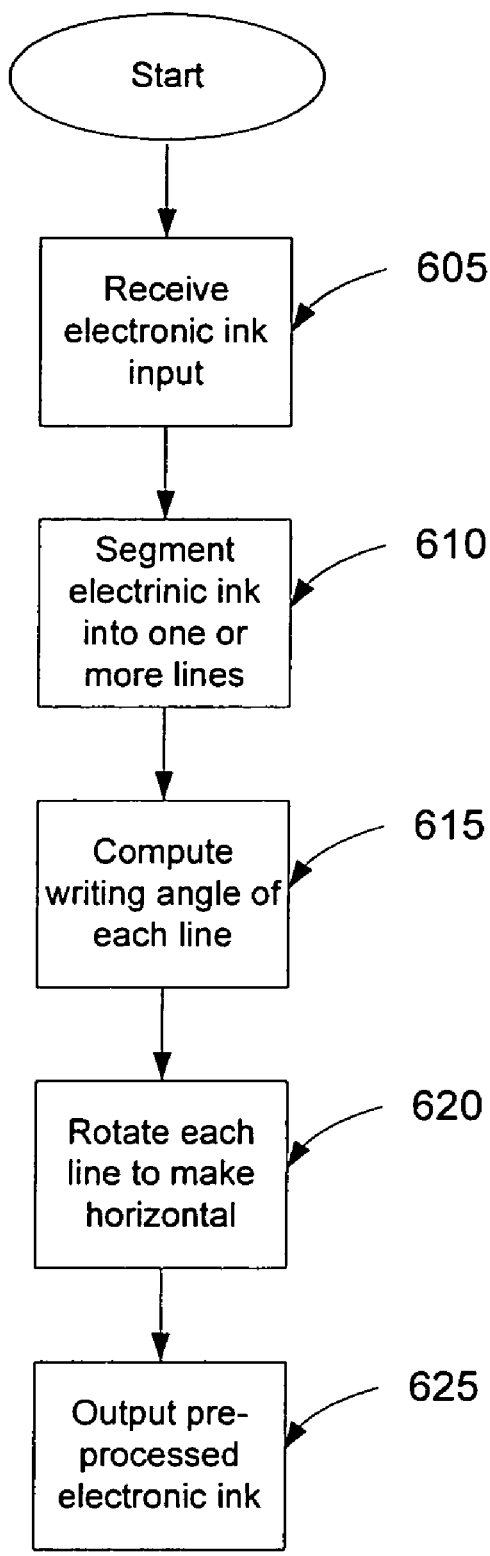
FIG. 6 is a flow chart illustrating the overall process for preprocessing an electronic ink object to generate a line-separated and rotated electronic ink object in accordance with an embodiment of the invention.

Referring to FIG. 6, there is shown a flow chart illustrating the overall process for preprocessing an electronic ink object 510 to generate a line-separated and rotated electronic ink object 550. At step 605, the preprocessor 505 receives an ink object 510 comprising one or more strokes of electronic ink as an input. The preprocessor 505 thereby generates one or more features for each stroke in the ink object 510. At step 610, the preprocessor 505 determines the number of lines that are present in the received electronic ink object 510. At step 615, the preprocessor 505 computes a writing angle for each line and, at step 620, the preprocessor 505 rotates each line to make it horizontal. In accordance with one embodiment discussed above, the writing angle is determined by approximating a centerline of a line of electronic ink and using the slope of the centerline to determine the writing angle of the electronic ink. At step 625, the preprocessed (i.e., line-separated and rotated) electronic ink object 550 is output to, for example, a handwriting recognizer 515.

The order in which these steps occur can be a matter of design choice. In the example illustrated below with regard to FIG. 7, the preprocessor 505 classifies each stroke as it comes in and computes or re-computes a centerline for each new stroke. Once all of the strokes have been analyzed, then the preprocessor 505 rotates the lines. Those skilled in the art will appreciate, however, that the process may be varied. For example, the preprocessor 505 may analyze each stroke in the ink object 510 for line relation and, only after all strokes have been analyzed, compute a centerline and perform a rotation for each line.

Figure 7:
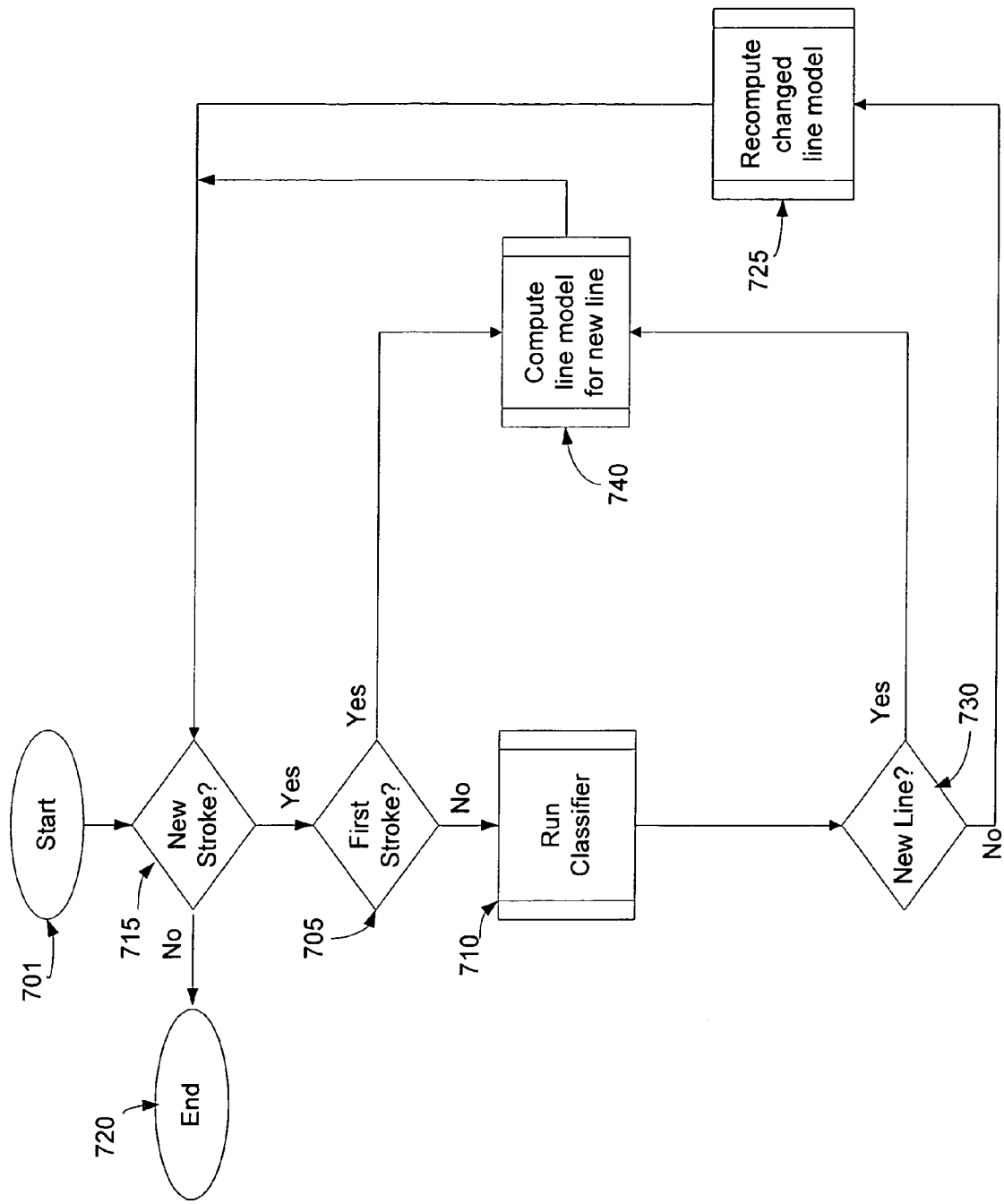
FIG. 7 is another flow chart illustrating in more detail the process for line-separating an electronic ink object consisting of a series of ink strokes in accordance with an embodiment of the invention.

FIG. 7 is a more detailed flow chart illustrating an exemplary process for line-separating an electronic ink object 510 consisting of a series of ink strokes. The process starts at step 701 where it is assumed that the features of each ink stroke have already been identified by the electronic ink feature generator 520. At step 705, the system determines whether the received features of the stroke are for the first stroke in the series. If the received stroke is the first stroke (i.e., no prior strokes have been received), at step 740, the system necessarily determines that the stroke is part of a new line. If the received stroke is not the first stroke, at step 710, the system runs the line breaking classifier 525 and, at step 730, determines whether the received stroke is a new line, a part of the existing line, or a part of a previous line. In any event, the output of the line breaking classifier 525 is provided to the centerline generator 535.

If the line breaking classifier 525 determines that the received stroke is part of a new line, at step 740, the centerline generator 535 computes a line model for the new line (as well as optionally performing other computations regarding the stroke such as the standard deviation of the stroke's data points to the line). This information is then stored in the line mapping database 530. At step 745, the system waits a specified time period for the next stroke to come in. If a new stroke is received, then the features of the new stroke are provided to the line breaking classifier 525 to perform step 710 describe above. If no new stroke is received within the specified time period, then the process halts at step 750.

If, on the other hand, the line breaking classifier 525 determines that the received stroke is part of the current line or one of the previous lines, at step 740, the centerline generator 535 re-computes the line model for that current or previous line (as well as optionally performing other computations regarding the stroke such as the standard deviation of the stroke's data points to the current or previous line). Once again, this information is then stored in the line mapping database 530. At step 715, the system waits a specified time period for the next stroke to come in. If a new stroke is received, then the features of the new stroke are provided to the line breaking classifier 525 to perform step 710 described above. If no new stroke is received within the specified time period, then the process halts at step 720.

Once the strokes in the ink object 510 have been line-separated and the centerline information is calculated for one or more lines of strokes, the ink transformer 540 may rotate one or more non-horizontal lines of electronic ink so that the line or lines become horizontal.

In another preferred embodiment, the preprocessor 505 may generate soft decisions regarding line separation to the handwriting recognizer 515. For example, the preprocessor 505 may provide probability estimates regarding the likelihood that a given stroke is part of a given line. These probabilities would then be fed to the handwriting recognizer which would consider a tree of decisions about the line separation.

Those skilled in the art will appreciate that the invention may be useful in any number of applications requiring character recognition. Depending on the application, however, preprocessing the electronic ink object for only line separation or ink rotation may be desirable. Accordingly, the type of preprocessing that is not desired may be omitted.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the invention. Also, where certain units of properties such as size (e.g., in bytes or bits) are used, any other units are also envisioned.

We claim:

1. A method of preprocessing an electronic ink object comprising the steps of:
    segmenting the electronic ink object into a plurality of lines;
    estimating a writing angle of each line; and
    rotating each line to make horizontal;
    and creating a model of each line for interpretation and further evaluation between the points of local extrema of the segmented electronic ink object and the model to reduce incorrect instances of recognition; wherein the model includes:
    employing an electronic ink feature generator;
    employing a line breaking classifier;
    employing a mapping database; and
    an ink transformer.

2. The method of preprocessing an electronic ink object of claim 1 further comprising the step of:
    recognizing the segmented and rotated electronic ink object to identify at least one character.

3. The method of preprocessing an electronic ink object of claim 1 wherein the electronic ink object comprises at least one ink stroke and the step of segmenting includes the step of (i) identifying a plurality of features for each ink stroke of the electronic ink object; and (ii) classifying each ink stroke as part of a new line, a current line, or a previous line.

4. The method of preprocessing an electronic ink object of claim 3 wherein the step of classifying is performed using a neural network.

5. The method of preprocessing an electronic ink object of claim 3 wherein the step of classifying is performed using a hidden Markov model.

6. The method of preprocessing an electronic ink object of claim 3 wherein the step of classifying is performed using a decision tree.

7. The method of preprocessing an electronic ink object of claim 3 wherein the step of classifying is performed using a Bayesian net.

8. The method of preprocessing an electronic ink object of claim 3 wherein the step of classifying is performed using a K Nearest Neighbor (KNN).

9. The method of preprocessing an electronic ink object of claim 3 wherein the step of classifying is performed using an Expert System.

10. The method of preprocessing an electronic ink object of claim 3 wherein if the ink stroke is part of the new line, the step of estimating includes the step of computing a slope of the new line.

11. The method of preprocessing an electronic ink object of claim 3 wherein if the ink stroke is part of the new line, the step of estimating includes the step of computing a slope of a centerline of the new line using a Least Mean Squares algorithm.

12. The method of preprocessing an electronic ink object of claim 1 wherein the step of rotating is performed using a rotation matrix.

13. A computer-readable medium having computer-executable instructions for performing the steps recited in claim 1.

14. A system for processing an electronic ink object having at least one ink stroke comprising in combination:
    an input that receives the electronic ink object;
    an electronic ink feature generator that receives the inputted electronic ink object and generates at least one feature for the at least one ink stroke of the electronic ink object;
    a classifier that classifies the at least one ink stroke of the electronic ink object into a plurality of lines based on the feature of the ink stroke; and
    an ink transformer that rotates each of the plurality of lines of electronic ink corresponding to a center of the ink object from a non-horizontal to a horizontal relationship according to each of the plurality of lines having a spatial orientation deviating from a horizontal placement upon a graphic display and better facilitate preprocessed electronic ink object to written character recognition.

15. The system of claim 14 wherein the classifier is a neural network.

16. The system of claim 14 wherein the classifier is a hidden Markov model.

17. The system of claim 14 wherein the classifier is a decision tree.

18. The system of claim 14 wherein the classifier is a Bayesian net.

19. The system of claim 14 wherein the classifier is a K Nearest Neighbor (KNN).

20. The system of claim 14 wherein the classifier is an Expert System.

21. The system of claim 14 further comprising:
    a user interface that generates the electronic ink object.

22. The method of preprocessing an electronic ink object of claim 1 wherein the model of each line for interpretation is a Gaussian model.

23. The method of preprocessing an electronic ink object of claim 1 wherein the segmenting the electronic ink object into a plurality of lines based upon at least one occurrence of a cusp within the at least one ink stroke, and defined as differences between tangents on successive points of a chord of the at least one ink stroke.

24. The system of claim 14 wherein the classifier that classifies the at least one ink stroke of the electronic ink object into a plurality of lines based upon at least one occurrence of a cusp within the at least one ink stroke, and defined as differences between tangents on successive points of a chord of the at least one ink stroke.

* * * * *